United States Patent [19]
Bade et al.

[11] 3,950,982
[45] Apr. 20, 1976

[54] AEROSOL WATER BATH

[75] Inventors: Louis W. Bade, Pompton Lakes;
Eric Avensbo, Ramsey, both of N.J.

[73] Assignee: Houbigant, Inc., Ridgefield, N.J.

[22] Filed: Apr. 9, 1975

[21] Appl. No.: 566,472

[52] U.S. Cl. .................... 73/41.2; 73/45.5
[51] Int. Cl.² ........................ G01M 3/10
[58] Field of Search .......... 73/41, 41.2, 41.3, 41.4, 73/45.4, 45.5, 49.2, 49.3, 52; 198/131, 179; 214/1 B, 1 BA

[56] References Cited
UNITED STATES PATENTS

| 287,048 | 10/1883 | Norton et al. | 73/41.2 |
|---|---|---|---|
| 609,232 | 8/1898 | Holden et al. | 73/41.2 |
| 1,213,308 | 1/1917 | Gallup | 198/131 |
| 2,759,593 | 8/1956 | Copping | 198/179 |
| 3,590,982 | 7/1971 | Banyas | 198/179 |
| 3,777,875 | 12/1973 | Sobran | 198/131 |

FOREIGN PATENTS OR APPLICATIONS

| 6,700,897 | 7/1968 | Netherlands | 73/41.2 |

Primary Examiner—Donald O. Woodiel
Assistant Examiner—John S. Appleman
Attorney, Agent, or Firm—David H. Semmes

[57] ABSTRACT

An improved aerosol can testing apparatus including an endless belt carrying a plurality of can suspending members on either side, the aerosol cans being suspended vertically by a spring load plastic finger assembly, and with further automatic can discharge means.

7 Claims, 5 Drawing Figures

AEROSOL WATER BATH

BACKGROUND OF THE INVENTION

1. Field of the Invention

Water baths are used to detect leaking glass, plastic or metal aerosol containers and or valves after they have been filled with a product and pressurized with a propellant. Such testing is necessary to comply with Department of Transportation (D.O.T.) regulation No. 173.306 Part 3, Section V.

A water bath, as it exists on today's market, consists of a tank filled with water at approximately 120° – 140° F.

Through the water and the length of the tank, a conveyor carries an aerosol container from the input end to the discharge. The container is conventionally carried on the conveyor by means of a puck or nest which must be fitted to the size of the particular containers to be tested.

Different size containers require different sets of pucks at a cost of from $1,000 to $1,500 per set dependent upon size, quantity required, length and speed of conveyor.

An operator is required to carefully insert part of the container into the puck at the intake end and another operator required to take the container out of the puck at the discharge end.

The container, passing through the hot water of the tank, increases the pressure of the propellant, and should be a "leaker" due to a defective valve, crimp or container, bubbles will appear in the water.

An inspector, checking for "leakers", will then remove the rejected container.

2. Description of the Prior Art

The following U.S. patents illustrate various prior art conveyor belt designs which have in the past been available for testing sundry types of containers water immersion:

| RUBIN | 699,244 |
| CUSHMAN, ET AL | 1,446,161 |
| DAVIS | 3,270,552 |
| MUCCI | 3,350,919 |
| AQVIST | 3,495,444 |
| GUNDAL, ET AL | 3,550,432 |

Rubin discloses a machine for testing cans which have been charged with compressed air. The cans are passed into a hot water bath and potentially leaky cans can be noted by the passage of bubbles through the water. Rubin furthermore teaches a system for automatically discriminating between leaky and good cans. The actual means for holding the can in place is an axial compression clamping means, requiring flat ends on both sides of the container.

Cushman teaches a bottling and testing apparatus for commonly bottled beverages, such as soft drinks, wherein only one size of bottles may be placed upon angle-shaped strips of metal arranged in pairs and riveted to a moving belt. This machine is not adjustable; adapted for only one size bottle.

Davis teaches an apparatus for testing pressurized receptacles in a heated liquid bath, and employs magnets to hold containers below water; thusly, limited to ferro-magnetic containers. Together with the magnets, the patentee employs nonadjustable guide rails.

Mucci teaches another testing apparatus disclosed for pressurized aerosol cans. However, the clamp means for holding the container below the top of the heated liquid bath, as seen in FIGS. 8 and 9, requires an arm 100 pressurized against the side of the aerosol wall by means of spring 109. Upright struts 89 are required on opposite side walls of the aerosol container to further hold the container in place. Consequently, several limiting factors are involved in the use of such arrangement. The mounting, including rollers 108 and upright pegs 111, limit clockwise movement of the lever so that cans of unusually large or small diameters cannot be employed by using such a device. Futhermore, when cans of very large or very small heights are employed, spacers 94, 95 must be replaced. Additionally, only one can be mounted at a given point on the conveyor, whereas the dual mounting of the instant invention allows an equivalent total belt length one half the length of any single mounting.

Aqvist teaches another testing means for aerosol cans, however, his entire structure depends upon whether cans float or sink in a heated liquid bath; categorically not relying upon bubble production from cans suspended from a belt.

While Gundal teaches a testing apparatus employing heated water to raise the pressure inside the package to a point in which leaking bubbles will be produced, the cans are held below a water level surface by pumping water through conduits having holes in communication with the bottom of the containers. Rapid water pumping causes a reduction in pressure below the level of the can, thus holding the can in place. Gundal, et al does not employ any suspension clamping means whatsoever; both requiring the expenditure of a large quantity of energy in pumping the water through the conduits in order to keep the cans in place, and being adaptable only for flat bottomed cans.

None of the above noted references teach a combination which even categorically and advantageously employs a suspended aerosol clamping means, as is taught by the instant invention.

Other workers have in the past employed means to suspend containers for water bath testing, however, none have employed the particularly advantageous combination of elements as is taught hereinafter for the instant invention. The following patents are also illustrative of prior art clamping devices; as well as certain other subcombination features which are per se well known in the field of the instant invention:

| Netherlands | 6,700,897 |
| NORTON | 287,048 |
| MONROE | 358,562 |
| MANN | 369,539 |
| JOHNSON | 876,558 |
| YOUNGS | 2,292,983 |
| DAVIDSON | 3,848,459 |

The Netherlands patent shows a device employing a cammed arrangement of gripping cans, in the neck region just below a cap. However, as seen from FIGS. 4 and 5, the clamp is not universally adaptable to various neck diameters; requiring further a plunger mechanism to come down over the holder assembly so as to open it for both connection and release of the can. As a result, a different clamp and plunger actuator assembly is also required for each different can size to be tested.

The patents to Norton, Mann and Monroe illustrate water baths using different types of steam coils for heating. Norton also shows a drying trough, at M, where the source of heat is another steam coil. Norton also teaches yet another type of cradle and compression clamping arrangement, at FIG. 7, which must be physically adjusted every time a different can size is used. Monroe illustrates using an additional steam pipe at 24 to clean the cans as they travel along a conveyor. Mann shows, at FIG. 5 a spring loaded chute for releasing a can which is conventionally held on a conveyor by axial compression, as shown at FIG. 4.

Johnson similarly and conventionally illustrates holding cans to be tested shown with a compression device at FIG. 1. The non-analogous patent to Youngs shows a device for testing rubber articles, and is of present interest only for showing a conveyor employing hangers on either side of a belt, and for a further showing that a water bath may conventionally employ a wetting agent.

Finally, Davidson illustrates yet another known device for testing aerosol cans that is without structural similarity to the particularly advantageous structure of the instant invention.

SUMMARY OF INVENTION

The present invention provides an improved apparatus for pressure testing aerosol cans of varying heights and diameters. Through the novel improved device according to the instant invention, cans of various and sundry sizes which have the common feature of an upper neck portion including a peripheral flange thereabout are advantageously suspended on either side of a continuous conveyor belt and then automatically discharged. The apparatus according to the instant invention which allows this universal bubble testing of any size aerosol container includes a plurality of can suspending devices which include a beveled plastic finger mounted on a vertically and rotatably supported plate together with a second spring loaded beveled finger to support and suspend any size aerosol container.

An aerosol can testing apparatus according to the instant invention includes a particularly economical and efficient apparatus for supporting cans to be tested in a heated liquid bath. The novel can suspending apparatus allows cans to be suspended in vertical planes on either side of the plane of movement of an endless belt, therefore, enabling efficient use and minimal length for the endless conveyor.

According to the instant invention there is further taught an automatic discharge means which eliminates the necessity of manual intervention for unloading aerosol cans which have passed the bubble test. The automatic discharge means advantageously includes a housing including a resilient spring to effectively open the spring loaded finger allowing the aerosol can to descend to a ramp towards a further manufacturing step. A further object of this invention is to teach particularly efficient structure for drying the cans as they are ready to be discharged from the water bath testing operation.

Moreover, other features, objects and advantages of the invention will become apparent by reference to the following detailed description and drawings.

DESCRIPTION OF THE PREFERRED EMBODIMENT

Figure 1:
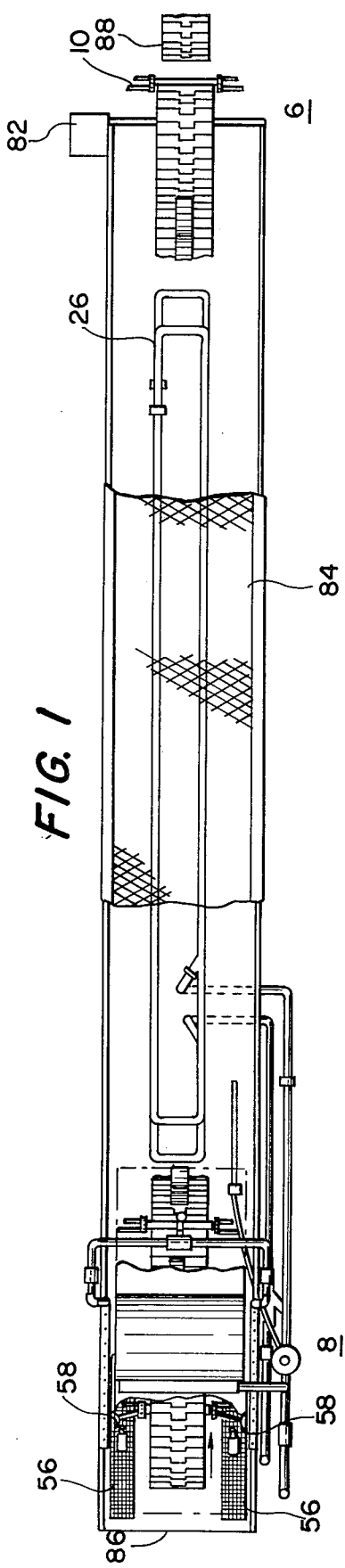
FIG. 1 schematically illustrates in a top view a water bath testing apparatus according to the instant invention, with portions of the apparatus broken away in order to illustrate certain features.

Referring now to the drawings, the pressure testing apparatus according to the instant invention includes an elongated tank 2 through which a nylon chain conveyor is movable. The nylon conveyor is trained onto a series of rollers including a roller at a first end 48 and a roller assembly at the opposite end including rollers 44 and 46. As shown most clearly in FIG. 2, there is a motor and variable speed drive assembly schematically illustrated at 42 to supply a power input to the drive sprocket 44. The endless conveyor 4 is trained onto the rollers and is further guided by guides 52 and 54, including other such guides as is conventionally known to be required to ensure effective operation including such members as idler 50.

As seen in FIG. 1, the apparatus includes a first end denoted 6, which may be advantageously employed to load aerosol cans for traversal of the water bath. At the second end, generally designated 8, the aerosol cans are illustrated to be discharged through an automatic means.

Figure 3:
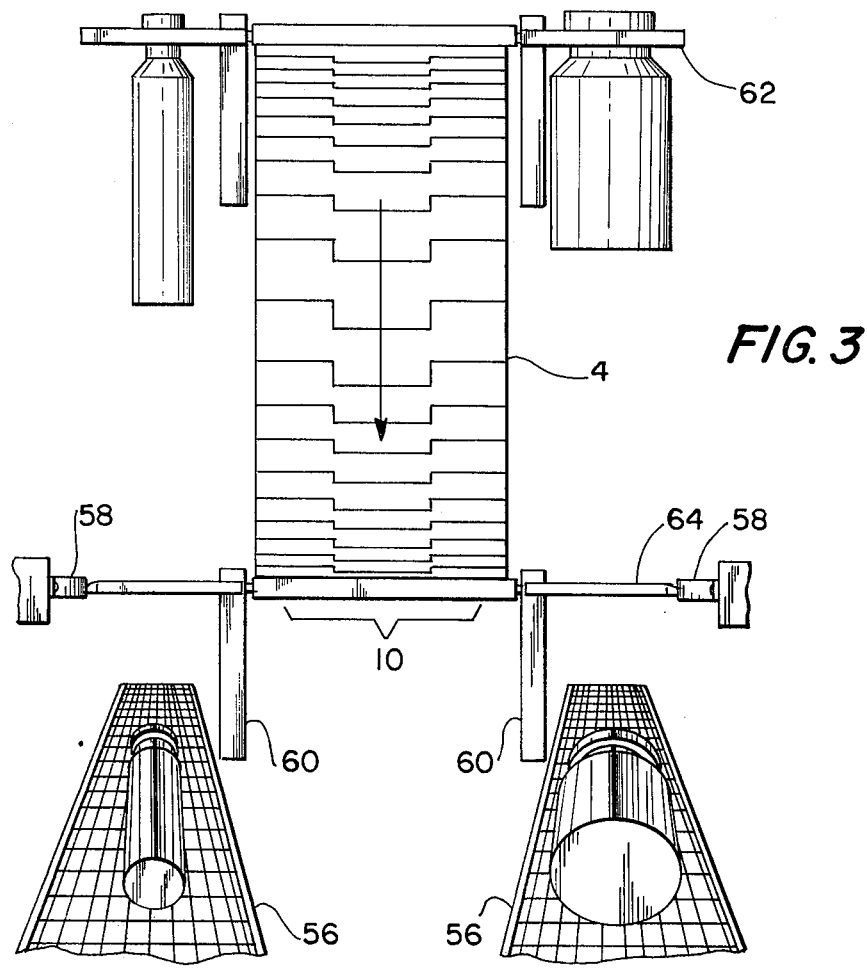
FIG. 3 schematically illustrates an end view at the discharge end of the apparatus, illustrating discharge of aerosol containers onto an inclined ramp.
Figure 4:
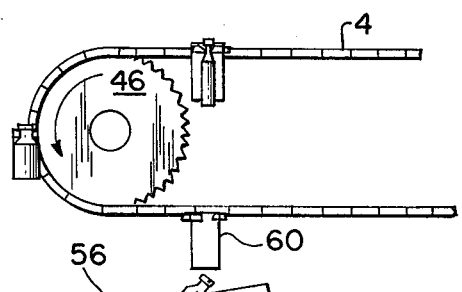
FIG. 4 is a further schematic view of the sequence as illustrated in FIG. 3.
Figure 5:
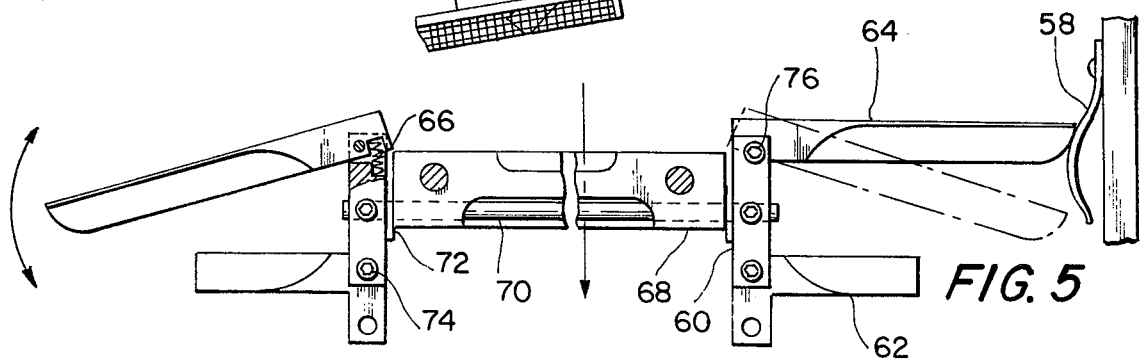
FIG. 5 is a detailed illustration of an embodiment of the novel aerosol can suspending assembly, with an illustration of its interaction with a release means.

A spring means comprises a spring placed to engage the resilient finger 64 which together with finger 62 supports and suspends the aerosol can during the water bath test. Referring to FIG. 5 the spring loaded finger 64 is resiliently urged towards the stationary beveled finger 62 through spring 66, and pivoted about cap screw 76. Both fingers 62 and 64 are arranged in a plane which is perpendicular to the vertical plane of steel plate 60. The steel plate 60, as can most easily be seen in FIG. 3, is itself pivoted around shaft 70 and rotates relative to connecting mounting member 68 upon bearing 72. Thus, as illustrated in FIG. 3, the aerosol can is suspended in a constant vertical alignment despite its position relative to the path of travel of the belt. As the endless conveyor moves the distal end of finger 64 past resilient spring 58 the spring loaded finger 64 will be temporarily urged away from stationary finger 62. Consequently, as illustrated in FIG. 4, an aerosol can which has been brought along conveyor 4 around roller 46 in a vertical position is then released upon a chute 56 which may advantageously be comprised of an open mesh which includes a surface coating of a polymeric material such as teflon.

The apparatus according to the instant invention advantageously includes means to dry the aerosol cans as they are brought out of the water bath to and towards the discharge station 8. A particularly advantageous use of energy is realized according to the invention through the steam line 14 which is shown to supply steam in flow relationship to the heat exchange coil assembly 26, while also supplying radiator 32. Steam exciting from radiator 32 is joined through pipe 34 with the steam return line at 30. Through the provision of blower 12, as shown clearly in FIG. 2, ambient air is directed downwardly over the radiator 32 so as to supply heated high pressure air over the tops of the aerosol cans previous to their discharge on ramp 56. In order to further assist the drying of the aerosol cans, a hot air line 36 is supplied which includes a hot air manifold positioned below the suspended aerosol cans previous to their discharge, as well as a second air blast 38 in order to provide an initial drying of the aerosol cans as they are brought up to the discharge end 8. Thermostatic controls are employed to control the temperatures and flow rates of the air used to so dry the aerosol cans, and insofar as they are conventional they are not further illustrated. The steam circuit which supplies and maintains the heated liquid bath is shown to be controlled through an auto temperature control, schematically designated 16 which together with a thermostatic sensor controls the flow rate of steam through line 24 into heating coils 26. Also provided in steam line 28 is a flow and thermostatic valve 20 together with an inline Y strainer to maintain the integrity of the steam flow.

Figure 2:
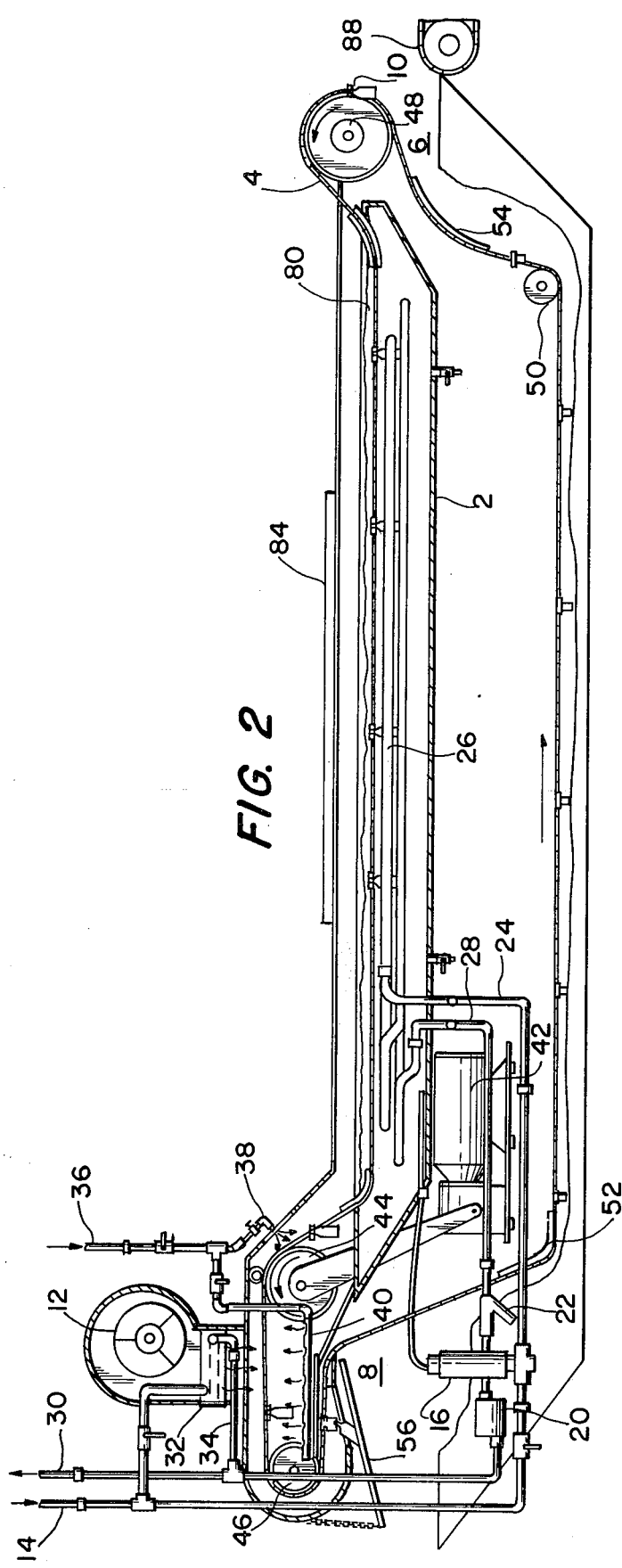
FIG. 2 schematically illustrates a side view of the preferred embodiment according to the invention with section views illustrating internal features.

A strain or guard assembly comprising a protective gate 84 is used over the water bath so that an operator may safely inspect the progression of aerosol cans as they are carried by the endless conveyor through the water bath. The presence of any bubbles indicates a "leaker" and the operator is thereby noticed that that can is to be removed at the discharge station 8. In order to conveniently allow this removal, there is provided in housing 86 an access to any given aerosol can as it moves between drive roller 44 and roller 46. As can be seen in FIG. 2, an operator may remove a defective can while it is horizontally conveyed between roller 44 and 46, while any aerosol can not so removed will be conveniently and automatically discharged onto ramp 56. At this point it is noted that while the end denoted 6 is conveniently illustrated to have a second conveyor means 88 which may be advantageously employed for loading aerosol cans, as at 10, the operation of the apparatus also advantageously allows an operator to mount a can at 8 just to the right of the automatic discharge means. This is particularly advantageous if space and operating personnel are at a premium.

As can be seen from the instant disclosure, the novel can supporting means together with the automatic discharge means is not limited to a particular sequence of mounting relative to the two ends of the device. In other words, an aerosol can may be mounted at end 6, as illustrated at 10, or a single operator may remove defective cans at end 8 while at the same time mounting aerosol cans to be tested through placement on the belt just after passing the ramp 56 in its movement towards the opposite end 6.

The operation of the improved water testing apparatus for aerosol cans as hereinabove described is, therefore, primarily the result of the novel end supporting means. The plates 60 are mounted outboard of the center line plane of movement of the entrained conveyor belt 60 as it traverses the vertically disposed rollers. By virtue of the steel, or other such material, plates 60 being mounted in a plane parallel to this plane of movement the aerosol cans are always maintained in a vertical orientation. Thus, the particularly advantageous spring loaded finger 64 may be engaged under the commonly found peripheral flange which is formed on the upper end of any sized aerosol can. The use of many different sized pucks or nests is therefore avoided, and the cans are securely and effectively supported while traversing the water test operation. The stationary finger 62 and the resiliently movable finger 64 are advantageously made out of a plastic material which will not mar an aerosol can whether it be made of glass, plastic, or metal. The instant can suspending apparatus according to this invention is, therefore, not limited to any particular aerosol container material, but rather will accommodate any size aerosol can. By virtue of the bevel design of the fingers, there is a knife edge contact between the underside of the peripheral flange on the aerosol container and the two fingers. By minimizing the width of this edge there will be a higher pressure for a given force of the spring 66, thus ensuring simple and effective holding of the aerosol cans. As is clearly illustrated at FIG. 5, the resilient spring 58 is statically mounted upon the housing, and therefore there is no need for involved mechanical camming for coodination between the spring 58 and the resilient finger 64. As a result, the movement of the belt for carrying the can holder assembly past the stationary spring 58 is sufficient to guarantee release of the aerosol can upon ramp 56. This advantageous design results in an extremely high level of reliability. As is shown in FIG. 5, finger 64 is substantially longer than stationary finger 62, allowing large diameter cans to be freely supported since only the distal end of finger 64 must contact spring 58 in order to effect release of the can onto chute 56.

While one embodiment of the invention has been shown and described, it is to be understood that certain changes and additions can be made by those skilled in the art without departing from the scope and spirit of the invention.

We claim:

1. In an aerosol can pressure testing apparatus for testing aerosol cans of varying heights and diameters, said cans having an upper neck portion including a peripheral flange thereabout, including heated liquid bath means through which an endless conveyor belt conveys said cans, said conveyor comprising an endless belt trained in a vertical plane of movement around roller means including rollers having horizontal axes of rotation, said rollers disposed above and at each end of said liquid bath, the improvement comprising:

a plurality of can suspending members carried upon said endless conveyor belt and operable to suspend said cans while traversing around and between said rollers, each member being pivotably mounted upon said belt and further comprising a vertical plate which is substantially parallel to and displaced from said vertical plane of said endless belt, means to allow said plate to pivot and remain vertical and substantially parallel to said plane of said endless belt while traversing around and between said rollers, a first stationary finger and a second resiliently movable finger mounted upon, and in a plane substantially perpendicular to, said vertical plate wherein said second finger is normally urged towards said first finger, whereby each of said plurality of can suspending means are operable to suspend aerosol cans of varying sizes in constant vertical orientation through resilient engagement of said fingers under said peripheral flange on said upper neck portions.

2. In the apparatus of claim 1, wherein the first stationary and the second resiliently movable fingers include beveled surfaces on respective edges facing, and operable for said engagement under, the peripheral flange of said aerosol cans.

3. In the apparatus of claim 1 further including means at one of said ends of said liquid bath operable to allow automatic discharge of an aerosol can from each of said suspending members, said means comprising:

a housing in encompassing relation to said one of said rollers at said end, said housing including a vertical surface juxtapositioned and parallel to the vertical plane of said pivotable plate and including resilient engaging means operable to engage said second resiliently movable finger and urge said second finger away from said first finger as said second finger is conveyed from said bath means and past said resilient engaging means.

4. In the apparatus of claim 3 further including inclined ramp means positioned below said automatic discharge means and operable to allow a discharged aerosol can to be delivered from said apparatus.

5. In the apparatus of claim 1 wherein said plurality of can suspending members are carried in two vertical planes disposed parallel to and on opposite sides of the vertical plane of movement of said endless belt.

6. In the apparatus of claim 1 wherein said liquid bath heating means comprises a steam coil submerged in said liquid bath means, steam line means including, in flow relationship, said steam coil and radiator means with a first air blower can drying means to supply ambient air past said radiator means and onto said plurality of cans as they are carried on said endless belt from said bath past one of said ends of said liquid bath to a discharge means.

7. The apparatus of claim 6 further including a second hot air drying means comprising a hot air manifold below said plurality of cans as they are carried past said one end, wherein said first can drying means is above said endless belt at said one end.

* * * * *